INVENTOR.
Arthur W. Millward

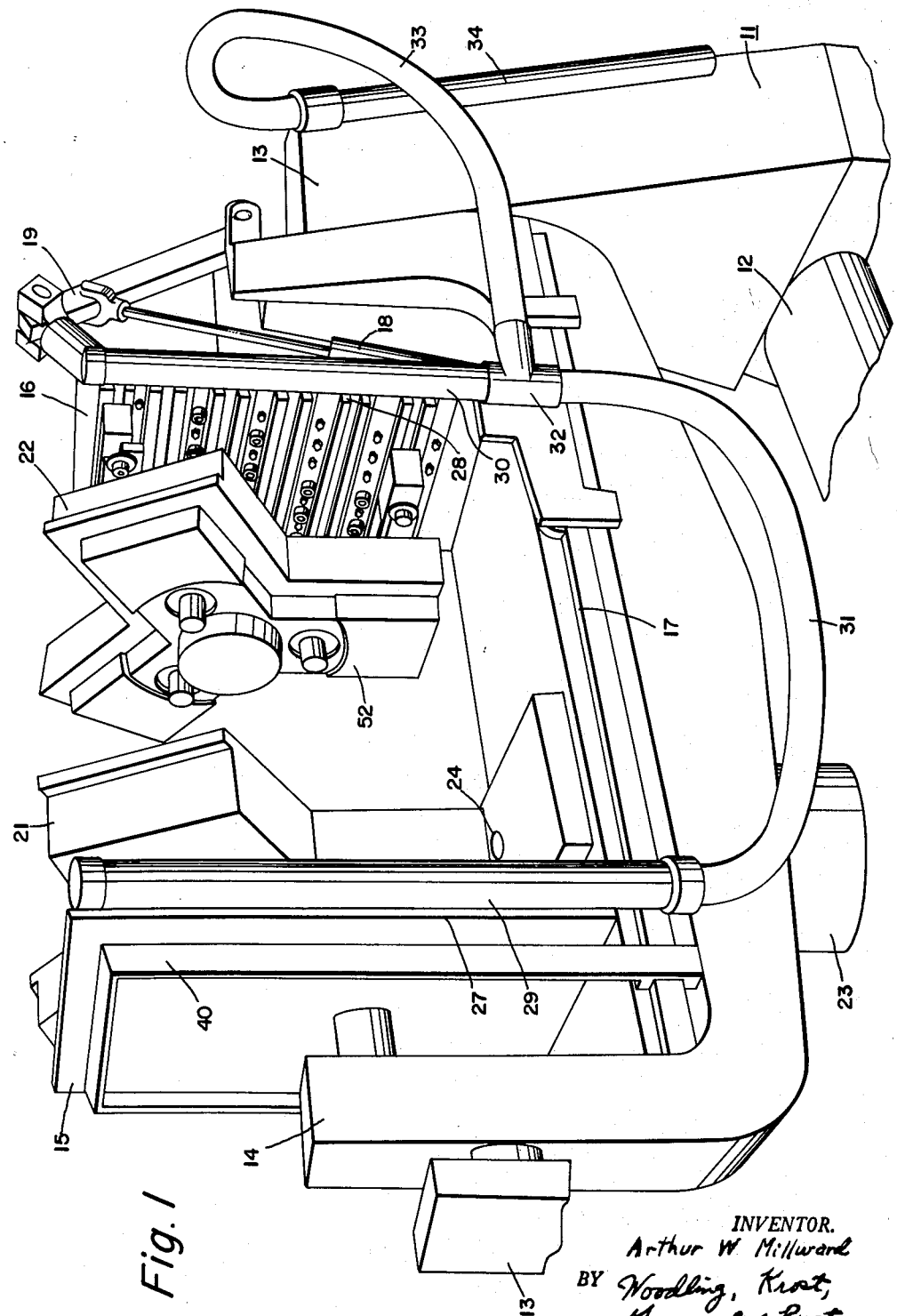

United States Patent Office 3,114,181
Patented Dec. 17, 1963

3,114,181
GAS FIRED FACE PLATE
Arthur W. Millward, Cleveland, Ohio, assignor to The National Acme Company, a corporation of Ohio
Filed Feb. 2, 1961, Ser. No. 86,680
5 Claims. (Cl. 22—10)

The invention relates in general to gas heated face plates and more particularly to the use of a gas heated face plate in a shell molding machine.

Shell molds, which include shell cores, are used in the foundry industry for molding metal parts in a sand mold with or without use of a sand core. These shell molds or cores are made of granular material such as sand with some form of binder or adhesive, which is cured with heat. Accordingly, it is important to quickly and uniformly heat the mold boxes or core boxes to cure the sand and adhesive mix.

In prior art shell molding machines such as shell core making machines, the face plate which carries the core box has been provided with T-slots to mount a core box thereon. Additionally, the T-slots have been used to permit passage of gas flames therefrom to heat the core box. This has been found to be wasteful of fuel because of the flames emanating in locations where there is no core box and, further, the flames tend to oxidize the machined surface of the T-slots which form the front face of the face plate and this tends to destroy the planarity of the face plate. Also, such use has resulted in non-uniform heating of the core box or mold box.

Accordingly, an object of the invention is to provide a gas heated face plate which eliminates the above-mentioned disadvantages.

Another object of the invention is to provide a gas heated face plate which separates the holding and heating functions.

Another object of the invention is to provide a face plate wherein the mold box is held in spaced relationship to the face plate so that gas flames may play more uniformly upon the mold box.

Still another object of the invention is to provide a gas heated face plate wherein one may easily select the area and pattern of the flame.

Still another object of the invention is to provide a face plate which has rows of fastening devices and alternate rows of gas ducts for selective heating of any mold box mounted on the face plate.

Other objects and a fuller understanding of this invention may be had by referring to the following description and claims, taken in conjunction with the accompanying drawing, in which:

FIGURE 1 is a perspective view of a shell core machine embodying the invention.

Figures 2, 3:
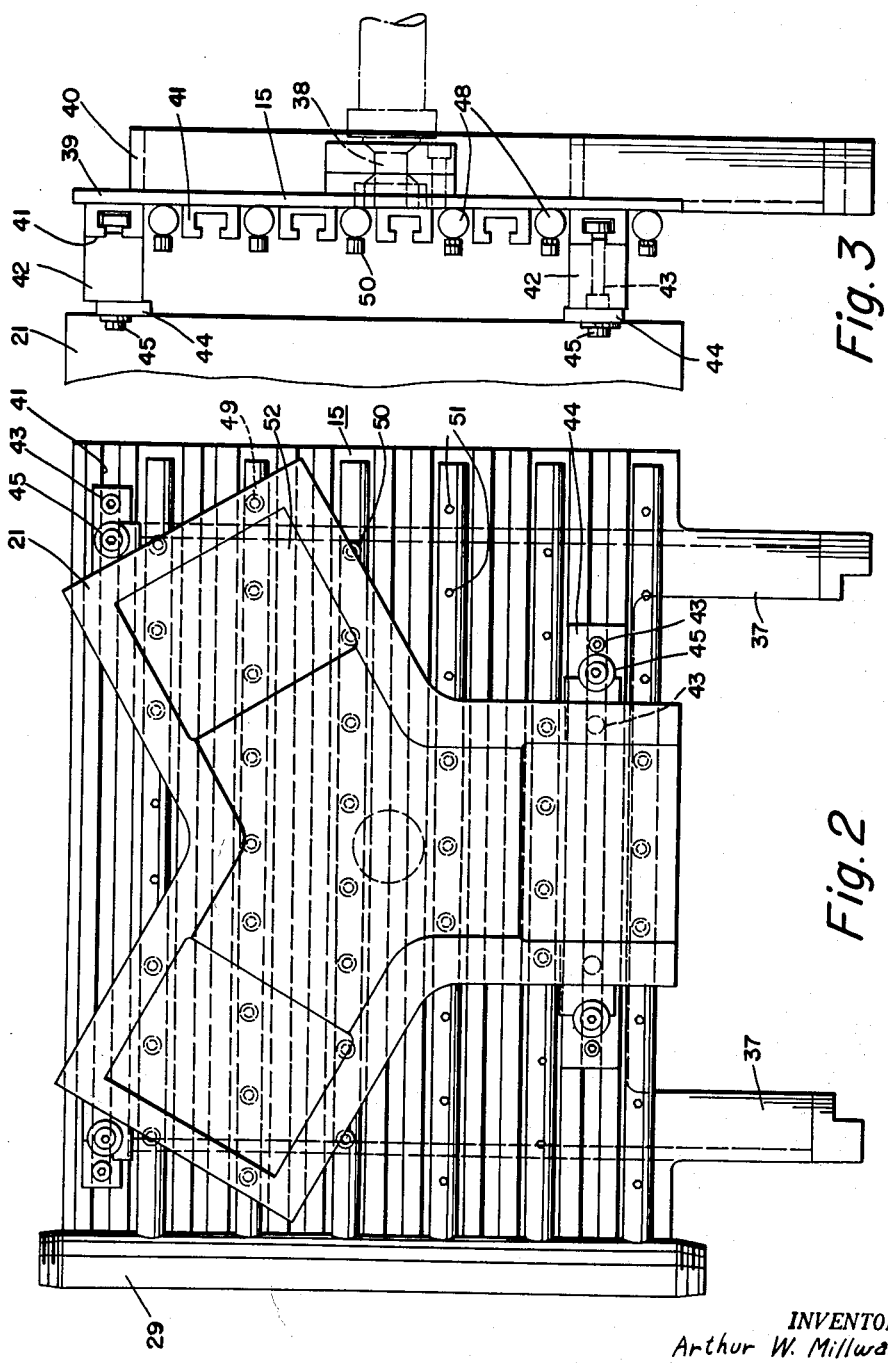
FIGURE 2 is a front view of a face plate embodying the invention.
FIGURE 3 is a side elevational view of the face plate in FIGURE 2.

The figures of the drawing show a shell core machine 11 which is one illustration among several of a machine which may embody the invention. This shell core machine 11 has a base 12 supporting a frame 13 which journals a carriage 14 on a horizontal axis. The carriage 14 carries a first fixed face plate 15 and a second movable face plate 16. This second face plate 16 is movable on ways 17 on the carriage 14. It is movable toward and away from the first face plate 15 by suitable means such as an air cylinder 18 and linkage 19. The first face plate 15 is adapted to mount a first core box half 21 which is one type of a mold box to receive and mold moldable material such as sand and binder into a shell mold or shell core. The second face plate 16 is adapted to mount a second core box half 22. The space between the face plates 15 and 16 thus defines a core box station. When the air cylinder 18 is actuated, the core box halves may be closed to define a complete core box. A sand chamber 23 has a discharge aperture 24 which may be moved to engagement with the closed core box and then the entire carriage 14 inverted to invest sand into the core box. The heat of the core box halves, as will be subsequently described, cures the binder mixed with the sand and to form a shell core and the carriage is again returned to the upright position shown in FIGURE 1, whereupon any sand unused in the inventment of the core box may be returned to the sand chamber 23.

The face plates 15 and 16 have first edges 27 and 28, respectively, on which are carried gas manifolds 29 and 30. A flexible hose 31 is used to connect together the two manifolds 29 and 30 to permit opening and closing of the face plates. A T-connection 32 provides an input to the manifolds through a second flexible hose 33 from a fuel input line 34. The flexible hose 33 provides flexibility for inversion of the carriage.

FIGURES 2 and 3 show in greater detail the face plate 15, and face plate 16 is substantially identical thereto, except that the gas manifold is on the opposite edge as one views the front of the face plate. The face plate 15 has support legs 37 for support from the carriage 14. Also, the rear of the face plate is carried from the carriage at a mount 38. The face plate 15 includes a flat plate 39 plus a rear stiffening flange 40, and on the front of this plate 39, a series of T-slots 41 are fixed. These T-slots may be welded or otherwise fastened to the plate 39 in horizontally spaced relationship and extend laterally across the front of the face plate. Six such T-slots are shown and this has been found satisfactory for this size face plate, although, obviously, a smaller or greater number may be used. Spacers 42 are fixed at suitable locations in the T-slots 41 by headed bolts 43. The core box half may have extending flanges 44 which may be bolted at 45 to the spacers 42. If the core box half is not provided with extending flanges 44, then clamps may be bolted to the spacers 42 to overlie a portion of the core box half to fasten it to the face plate.

Gas ducts 48 extend laterally across the face plate and communicate with the manifold 29. Each gas duct is disposed between two adjacent T-slots and accordingly the gas ducts are horizontal and, in this case, six are shown, one below each T-slot. A plurality of apertures 49 are drilled and tapped in the gas ducts 48 to face forwardly, that is, facing in an axially parallel direction. In selected ones of the apertures 49, gas jets 50 are threaded to play a plurality of flames on the rear of the core box half 21. The selected ones of the apertures are those of generally the same area and shape as the shape of the core box half being heated. The remainder of the apertures have threaded plugs 51 therein to close off these apertures. The gas jets 50 thus are able to generally a wall of flame which plays on the rear of the core box half to uniformly heat same. This uniform heating is aided by the spacing of the core box half away from the face of the face plate so that the flames have practically uninhibited freedom to act on such core box half.

The gas ducts 48 may be fastened in any suitable manner to the face plates such as by spot welding. These gas ducts form conduit means from the gas manifolds to the gas jets 50 to readily permit selection of the area and shape of the wall of flame. The T-slots 41 permit ready placement of the spacers 42 at any desired location to mount any shape or size of core box.

The drawing shows a representative shell core 52 as having been formed and cured in the closed core box and FIGURE 1 shows this shell core in position ready for removal from the machine 11.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A shell core making machine comprising, in combination, a frame having an axis, first and second face plates, means operatively connected to relatively axially move said face plates toward and away from each other, T-slots fixed in parallel spaced planar relationship on each of said face plates, a plurality of spacers mounted in said T-slots to receive and mount a core box half spaced from and parallel to each face plate, a gas manifold fixed relative to each said face plate, gas distributing ducts leading from each said manifold and fixed relative to said face plates parallel to and between said T-slots, a plurality of apertures in each said duct, a plurality of gas flame jets received in selected ones of said apertures adjacent the rear of the respective core box halves, said gas jets disposed in a plane between the plane of the respective T-slots and the rear of the respective core box halves, the space between the plane of the gas jets and the plane of the rear of the respective core box halves being substantially unobstructed to direct generally a wall of flame on substantially only the rear of the respective core box halves, and plugs in the remainder of said apertures which are not adjacent a core box half.

2. A shell making machine comprising, in combination, a frame, a face plate carried on said frame, T-slots fixed in parallel spaced planar relationship on said face plate, a plurality of spacers mounted in said T-slots to receive and mount a mold box spaced from and parallel to said face plate, a gas manifold disposed along one edge of said face plate, gas distributing ducts leading from said manifold and fixed relative to said face plate parallel to and between said T-slots, a plurality of threaded apertures in each said duct, a plurality of gas flame jets received in selected ones of said threaded apertures adjacent the rear of said mold box, said flame jets disposed in a plane between the plane of said T-slots and the rear of said mold box, the space between the plane of the flame jets and the plane of the rear of said mold box being substantially unobstructed to direct generally a wall of flame on substantially only the rear of said mold box, and plugs in the remainder of said threaded apertures which are not adjacent the mold box.

3. In a shell molding machine, the combination of a frame, a pair of opposed face plates on said frame and relatively movable toward and away from each other along an axis, each face plate having a first edge, spaced parallel T-slots extending transversely across each face plate in a plane and generally perpendicular to said axis and to said first edge, spaced parallel gas ducts extending between said T-slots across each face plate, a gas manifold connected to one end of each gas duct on each face plate at said first edge thereof, a plurality of spacers mounted in said T-slots and extending axially to mount core box halves spaced from and parallel to each face plate, a plurality of axially parallel threaded apertures in said gas ducts, a plurality of gas jets threaded in selected ones of said threaded apertures adjacent the rear of any said core box half to uniformly heat same, said gas jets disposed in a plane between the plane of the respective T-slots and the rear of the respective core box halves, the space between the plane of the gas jets and the plane of the rear of the respective core box halves being substantially unobstructed to direct generally a wall of flame on substantially only the rear of the respective core box halves, and plugs threaded in the remaining ones of said threaded apertures to block gas flow therefrom.

4. A shell making machine comprising, in combination, a frame, a face plate carried on said frame, a gas manifold disposed along one edge of said face plate, spaced parallel gas distributing ducts leading from said manifold and fixed relative to said face plate, mounting means fixed in parallel spaced relationship in a first plane on said face plate between said gas ducts, a plurality of spacers mounted to said mounting means to receive and mount a mold box on said face plate with the rear of said mold box in a second plane spaced forwardly from said first plane, a plurality of threaded apertures in each said duct, a plurality of gas flame jets received in selected ones of said threaded aperture adjacent the rear of said mold box, said flame jets disposed in a third plane between said first and second planes to direct generally a wall of flame on substantially only the rear of said mold box and with the space between said second and third planes being substantially unobstructed, and plugs in the remainder of said threaded apertures which are not adjacent the mold box.

5. A shell making machine comprising, in combination, a frame, a face plate carried on said frame, mounting slots fixed in parallel spaced relationship in a first plane on said face plate, a plurality of spacers mounted in said mounting slots to receive and mount a mold box on said face plate with the rear of said mold box in a second plane spaced forwardly from said first plane, gas distributing ducts fixed relative to said face plate parallel to and between said mounting slots, a plurality of threaded apertures in each said duct, a plurality of gas flame jets received in selected ones of said threaded apertures adjacent the rear of said mold box, said flame jets disposed in a third plane between said first and second planes to direct generally a wall of flame on substantially only the rear of said mold box and with the space between said second and third planes being substantially unobstructed, and plugs in the remainder of said threaded apertures which are not adjacent the mold box.

References Cited in the file of this patent

UNITED STATES PATENTS

| | | |
|---|---|---|
| 2,852,818 | Shallenberger | Sept. 23, 1958 |
| 2,856,653 | Sutter | Oct. 21, 1958 |
| 2,929,119 | Ronne | Mar. 22, 1960 |
| 3,007,215 | Demmler et al. | Nov. 7, 1961 |

FOREIGN PATENTS

| | | |
|---|---|---|
| 736,119 | France | Sept. 12, 1932 |